(12) United States Patent
Terunuma et al.

(10) Patent No.: US 7,686,268 B2
(45) Date of Patent: Mar. 30, 2010

(54) STRUCTURE FIXING APPARATUS INCLUDING SUPPORT DEVICE

(75) Inventors: Miho Terunuma, Yao (JP); Yoshihiro Aramaki, Ikoma-gun (JP); Yasushi Ohkoshi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 801 days.

(21) Appl. No.: 11/430,021

(22) Filed: May 9, 2006

(65) Prior Publication Data

US 2006/0260670 A1 Nov. 23, 2006

(30) Foreign Application Priority Data

May 19, 2005 (JP) ............................. 2005-147015

(51) Int. Cl.
*E04G 3/22* (2006.01)
*E04D 13/18* (2006.01)
*A47G 23/02* (2006.01)
*H01L 31/042* (2006.01)

(52) U.S. Cl. .................... 248/237; 52/173.3; 52/173.1; 248/148; 248/346.03; 136/244

(58) Field of Classification Search ............... 52/173.1, 52/173.3; 248/237, 148, 346.03, 357, 222.14, 248/500; 277/628, 637, 644, 630; 136/244
See application file for complete search history.

(56) References Cited

U.S. PATENT DOCUMENTS

| 4,321,745 | A | * | 3/1982 | Ford | .................. 29/525.04 |
| 4,677,248 | A | * | 6/1987 | Lacey | .................. 136/244 |
| 5,164,020 | A | * | 11/1992 | Wagner et al. | .......... 136/251 |
| 5,746,029 | A | * | 5/1998 | Ullman | ................ 52/27 |
| 2003/0101662 | A1 | * | 6/2003 | Ullman | ................ 52/27 |

FOREIGN PATENT DOCUMENTS

| JP | 2000-213116 | A | | 8/2000 |
| JP | 2002213116 | A | * | 8/2000 |
| JP | 3084621 | | | 12/2001 |
| JP | 2005-2772 | | | 1/2005 |
| JP | 2005-133382 | | | 5/2005 |
| JP | 2005133382 | A | * | 5/2005 |

* cited by examiner

*Primary Examiner*—Robert J Canfield
*Assistant Examiner*—Babajide Demuren
(74) *Attorney, Agent, or Firm*—Nixon & Vanderhye, P.C.

(57) ABSTRACT

A structure fixing apparatus for attaching a structure on roof tiles, for example, the structure being a solar cell apparatus, includes a support device for supporting attachment hardware which is a part of a base for fixing a solar cell module, a fixing member formed to reach a sheathing through the support device and a roof tile, and a tubular portion formed to surround the fixing member and to be inserted in a through hole formed in the roof tile. The tubular portion is formed to be smaller in size than the through hole formed in the roof tile and to be in non-contact with the through hole.

12 Claims, 7 Drawing Sheets

STRUCTURE FIXING APPARATUS INCLUDING SUPPORT DEVICE

This nonprovisional application is based on Japanese Patent Application No. 2005-147015 filed with the Japan Patent Office on May 19, 2005, the entire contents of which are hereby incorporated by reference.

FIELD OF THE INVENTION

The present invention relates to a structure fixing apparatus for fixing a structure on a roof carrying roof tiles or the like.

DESCRIPTION OF THE BACKGROUND ART

In recent years, the solar cell apparatuses have increasingly been used, and many of the solar cell apparatuses are attached to the roof of a house.

When the solar cell apparatus is fixed on the roof of the house, a base is formed by assembling metal frames or the like on the roof. The base is formed as a part of the structure. The base is fixed to the roof by fixing apparatus. The solar cell apparatus includes a panel-type solar cell module. Generally, the solar cell module is fixed to the base. In many cases, a Japanese roof tile or a plain roof tile is used as a roof material, and various materials such as earthenware or cement are used.

Japanese Patent Laying-Open No. 2005-002772 discloses a solar panel fixing apparatus including a solar-panel-attachment roof tile having a notch formed in one end portion. The notch is formed deeper than a position of an end of a roof tile arranged underside. The solar-panel-attachment roof tile is placed over a normal roof tile made of ceramics and subjected to no working, so that a gap can be formed between the solar-panel-attachment roof tile and the normal roof tile. A support bolt of the solar panel is arranged in the gap, so that load imposed on the support bolt by the solar panel is prevented from transmitting to the solar-panel-attachment roof tile and the adjacent normal roof tile. In addition, according to the disclosure of Japanese Patent Laying-Open No. 2005-002772, cracking or damage in the solar-panel-attachment roof tile and the normal roof tile can be prevented. Moreover, intrusion by rainwater can be prevented by arranging a cover in the notch.

Japanese Utility Model Registration No. 3084621 discloses a solar power equipment attachment base fixing apparatus, in which one end of a support bolt is fixed to a substrate. The support bolt is inserted in an elastic collar, which is in turn fitted to a hole in a boss of a drilled roof tile, and a longitudinal frame and a lateral frame are fixed to the support bolt. According to the disclosure of Japanese Utility Model Registration No. 3084621, the support bolt comes in direct contact with the boss of the drilled roof tile, so as to prevent cracking in the boss.

A surface of the roof on which the roof tiles have been arranged is uneven, and many roof tiles are formed from earthenware. Accordingly, footing is unstable and slippery, and workability is poor. Therefore, a structure fixing apparatus for fixing a structure, that is readily attached to a roof carrying roof tiles or the like has highly been demanded.

In the solar panel fixing apparatus disclosed in Japanese Patent Laying-Open No. 2005-002772, it has been necessary to form a notch in a roof tile or to form a boss protruding from the surface of the roof tile. That is, the structure has been complicated. In particular, the roof tile having a boss formed in the surface should specially be manufactured.

Similarly, in the fixing apparatus disclosed in Japanese Utility Model Registration No. 3084621 as well, it has been necessary to use the roof tile in which the boss protruding from the surface is formed and a through hole is formed in the boss. Such a roof tile should specially be manufactured.

In addition, the shape or the material of the roof tile is various, and the roof tile to which the structure can be attached is limited. In particular, the roof tile is limited in the case of attachment of a panel-type solar cell module along the surface of the roof In other words, the solar cell module cannot be attached in some cases, depending on a type of the roof tile.

SUMMARY to the technology disclosed herein provides a structure fixing apparatus having a simplified structure, with which a structure can be attached without damaging a roof tile.

A structure fixing apparatus for attaching a structure on a roof tile according to the technology disclosed herein includes a support device for fixing and supporting the structure, a fixing member formed to reach a sheathing through the support device and the roof tile, and a tubular portion formed to surround the fixing member and to be inserted in a through hole formed in the roof tile. The tubular portion is formed to be smaller in size than the through hole formed in the roof tile, and at least a part of the tubular portion is in non-contact with the through hole. By adopting this configuration, a structure fixing apparatus having a simplified structure without damaging the roof tile can be provided.

According to the technology disclosed herein, preferably, the structure includes a base, and the support device is formed to support the base. By adopting this configuration, a structure fixing apparatus having a simplified structure without damaging the roof tile can be provided.

According to the technology disclosed herein, preferably, the structure fixing apparatus includes a water-shutoff member formed to close the through hole in the roof tile around the tubular portion. The water-shutoff member has a hole for insertion of the tubular portion formed. By adopting this configuration, intrusion by water through a space between the tubular portion and the through hole can be prevented with a simplified structure.

According to the technology disclosed herein, preferably, the structure fixing apparatus includes a water-shutoff member formed to close the through hole in the roof tile, and a pressing member arranged on the water-shutoff member, for pressing the water-shutoff member against the roof tile. By adopting this configuration, intrusion by water through a space between the tubular portion and the through hole can be prevented with a simplified structure.

According to the technology disclosed herein, preferably, the structure fixing apparatus includes a filler material filling a region surrounded by the through hole, the tubular portion and the water-shutoff member around the tubular portion. By adopting this configuration, intrusion by water through the through hole can be prevented with a simplified structure.

According to the technology disclosed herein, preferably, the support device includes a portion formed to have a cup-shaped cross-section, the support device is formed such that the base is attached to one plate portion of opposing plate portions, and the tubular portion is formed integrally with the other plate portion. By adopting this configuration, the configuration of the support device can be simplified and strength of the support device can be enhanced.

According to the technology disclosed herein, preferably, the structure includes a solar cell module. By adopting this configuration, the panel-type solar cell module can readily be attached along the surface of the roof.

The foregoing and other objects, features, aspects and advantages of the technology disclosed herein will become more apparent from the following detailed description when taken in conjunction with the accompanying drawings.

DETAILED DESCRIPTION

First Embodiment

A structure fixing apparatus according to a first example embodiment will be described with reference to FIGS. 1 to 4. In the present embodiment, a solar cell apparatus representing the structure is fixed to the roof. In many cases, the solar cell apparatus is fixed to the roof where roof tiles are arranged. The solar cell apparatus according to the present embodiment includes a solar cell module and a base for fixing the solar cell module. The solar cell apparatus is fixed to the roof by means of the structure fixing apparatus for supporting the base.

As the surface of the roof tile is curved, the surface of the tiled roof is uneven. When the solar cell module is attached to such a roof, a fixing apparatus for supporting the solar cell module is formed and fixed to the roof tile or a sheathing formed under the roof tile. The base is fixed to the fixing apparatus provided on the roof, and the solar cell module is fixed to the base.

Figure 4:
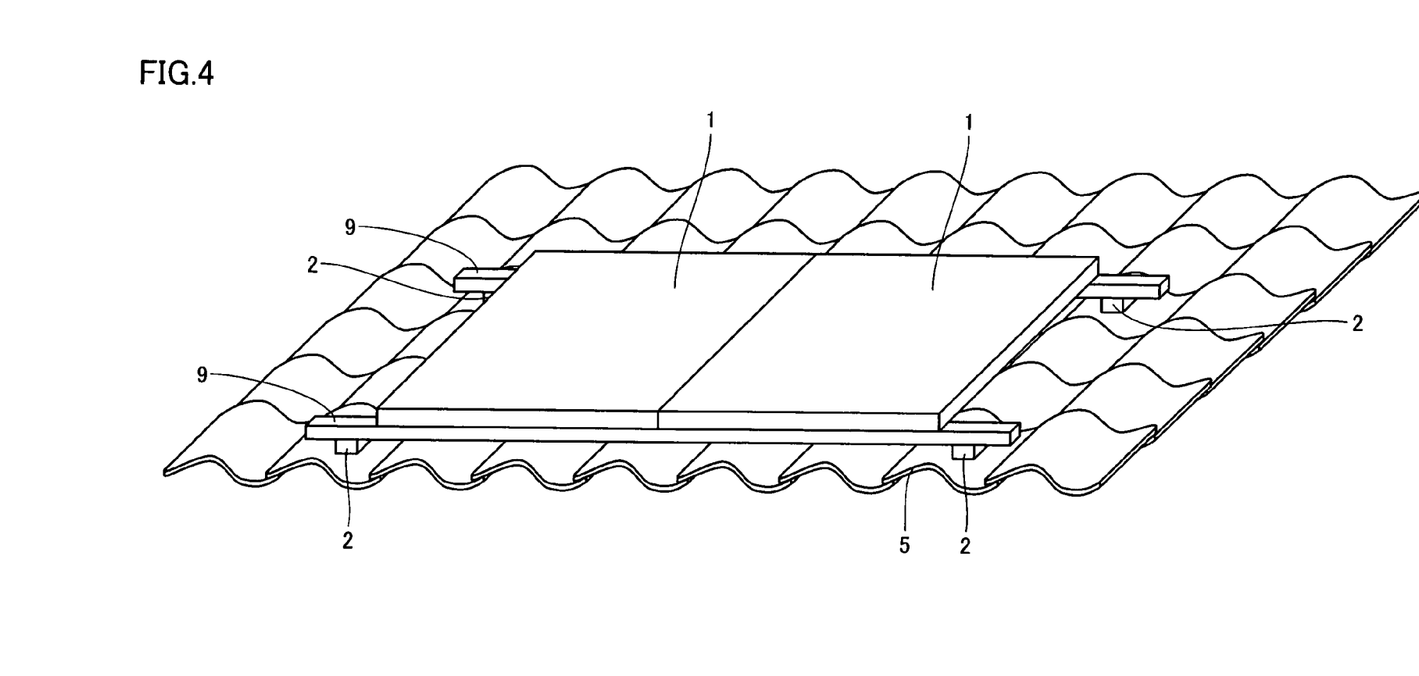
FIG. 4 is a schematic perspective view when a solar cell apparatus is attached to a tiled roof

FIG. 4 is a schematic perspective view of a general solar cell apparatus attached to the roof of a house. The solar cell apparatus according to the present embodiment is attached to the roof where a plurality of roof tiles 5 are arranged. The solar cell apparatus according to the present embodiment includes two solar cell modules 1 and the base. The base includes a lateral frame 9 for fixing a plurality of solar cell modules 1 and attachment hardware 2 for supporting lateral frame 9. Lateral frame 9 and attachment hardware 2 in the present embodiment are formed from metal.

The solar cell apparatus in the present embodiment includes the structure fixing apparatus arranged under the base, and attachment hardware 2 is supported by a support device of the structure fixing apparatus which will be described later. The support device is fixed to the not-shown sheathing formed under roof tile 5.

Figure 1:
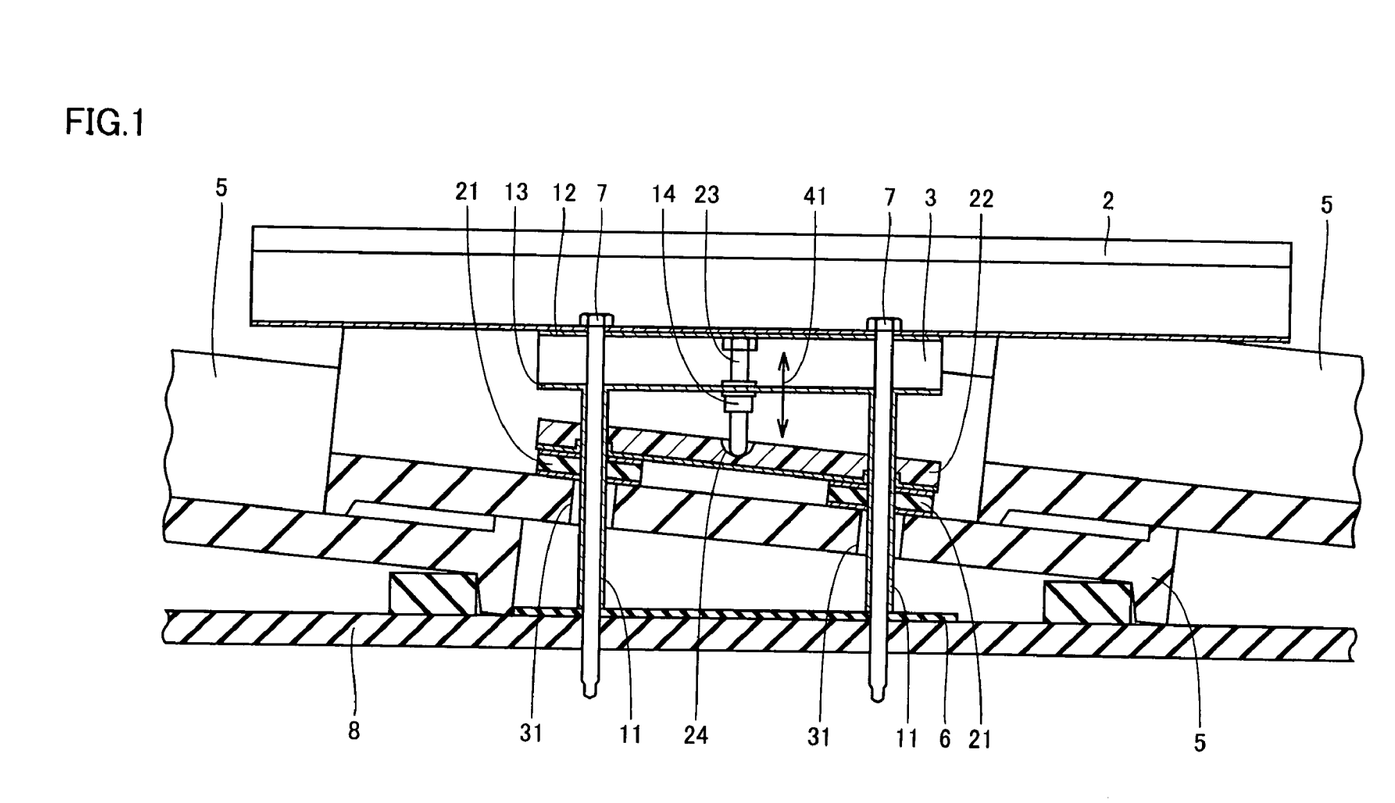
FIG. 1 is an enlarged schematic cross-sectional view of a structure fixing apparatus according to a first embodiment.
Figure 2:
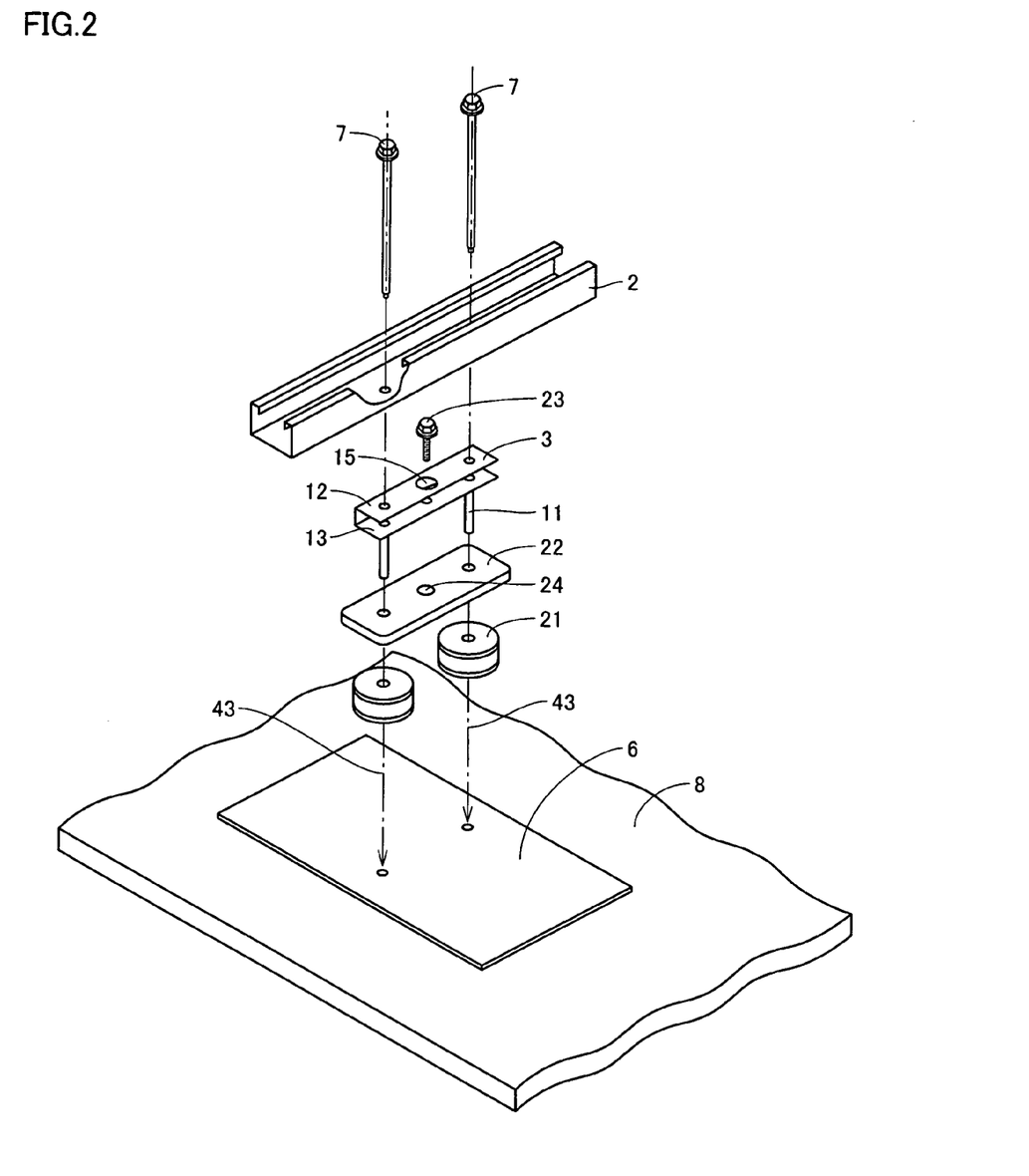
FIG. 2 is an exploded perspective view of the structure fixing apparatus according to the first embodiment.

FIG. 1 is an enlarged schematic cross-sectional view of the structure fixing apparatus for the solar cell apparatus according to the present embodiment. FIG. 2 is an exploded perspective view of the structure fixing apparatus. The structure fixing apparatus according to the present embodiment includes a support device 3 formed from a metal.

Attachment hardware 2 and support device 3 are fixed to a sheathing 8 formed under roof tile 5 by means of a fixing member 7. Fixing member 7 in the present embodiment is formed like a bar, and formed to penetrate support device 3 and roof tile 5. Fixing member 7 is formed to have a pointed end and formed such that it is fixed to sheathing 8 by sticking through sheathing 8. A reinforcement plate 6 is attached to the surface of sheathing 8. Reinforcement plate 6 is formed like a plate, and arranged in a portion where fixing member 7 sticks through.

Support device 3 in the present embodiment includes a portion formed to have a cup-shaped cross-section. The cup-shaped portion has two opposing plate portions 12, 13. One plate portion 12 is formed such that attachment hardware 2 is attached to its surface. A hole is formed in one plate portion 12, so that fixing member 7 can be inserted. A tubular portion 11 is formed in the other plate portion 13.

Tubular portion 11 in the present embodiment is in a cylindrical shape, and formed to extend substantially perpendicular to a main surface of the other plate portion 13. In the present embodiment, the cup-shaped portion and the tubular portion are integrally formed from a metal. Tubular portion 11 is formed such that fixing member 7 can be inserted therein. Tubular portion 11 is formed such that its lower end surface abuts on reinforcement plate 6 and support device 3 can be fixed.

In roof tile 5, a through hole 31 penetrating in a direction of thickness is formed. Tubular portion 11 is inserted in through hole 31. In the present embodiment, tubular portion 11 is formed to be smaller in size than through hole 31. Tubular portion 11 is formed such that at least a part thereof is in non-contact with through hole 31. Through hole 31 in the present embodiment is formed sufficiently large such that an entire outer circumference of tubular portion 11 is distant from a perimeter of through hole 31.

In a portion of the surface of roof tile 5 where through hole 31 is formed, a water-shutoff member 21 is arranged. In the present embodiment, water-shutoff member 21 is formed in a cylindrical shape. Water-shutoff member 21 is formed to have elasticity in a direction shown with an arrow 41. Water-shutoff member 21 is formed to be compressible in a direction of thickness. Water-shutoff member 21 is formed to close through hole 31. In addition, water-shutoff member 21 has a hole for inserting tubular portion 11 formed. Water-shutoff member 21 is formed such that it comes in intimate contact with through hole 31 in roof tile 5 and tubular portion 11 and closes a gap between through hole 31 and tubular portion 11, as a result of pressing from above.

A plate-like pressing member 22 is arranged on water-shutoff member 21. Pressing member 22 is formed to extend over two water-shutoff members 21 and to press two water-shutoff members 21 simultaneously. Pressing member 22 has a hole for inserting tubular portion 11. As described above, the fixing apparatus in the present embodiment is formed such that tubular portion 11 penetrates pressing member 22, water-shutoff member 21 and roof tile 5, abuts on reinforcement plate 6 attached to the surface of sheathing 8, and is fixed thereto.

A retainer 23 formed to press water-shutoff member 21 through pressing member 22 is arranged in support device 3. A screw attachment portion 14 is formed in the other plate portion 13. Screw attachment portion 14 is formed in a cylindrical shape and internally threaded. Retainer 23 is formed in a columnar shape and externally threaded. The retainer and the screw attachment portion are not limited as such, and for example, a bolt may be arranged as the retainer and a nut as the screw attachment portion may be fixed to the support device. The nut may be an element separate from the support device. As described above, the screw attachment portion may not directly be formed in the support device.

Retainer 23 is formed such that it is movable in a longitudinal direction shown with arrow 41, as a result of insertion in screw attachment portion 14 and turning. Retainer 23 is screwed and attached to support device 3. Retainer 23 is arranged in a substantially central portion when the other plate portion 13 is viewed two-dimensionally. Referring to FIG. 2, an insertion hole 15 for inserting retainer 23 is formed in one plate portion 12.

Referring to FIGS. 1 and 2, in the present embodiment, pressing member 22 is formed in a rectangular parallelepiped shape. A recessed portion 24 is formed in a substantially central portion of pressing member 22, in correspondence with a position of retainer 23. Recessed portion 24 is formed such that it is most recessed in the center when viewed in cross-section. Recessed portion 24 in the present embodiment is formed to have an arc-shaped cross-section. Recessed portion 24 is formed to be larger than an outer diameter of retainer 23.

In particular, when the solar cell apparatus is fixed to the roof of the house, the support device is preferably directly fixed to the sheathing or a rafter under a roof material, in order to ensure sufficient fixing strength. In addition, in order to ensure strength of the fixing apparatus as a whole that fixes the solar cell module, the support device is preferably attached at a plurality of locations. The support device is preferably attached at a plurality of locations in order to ensure sufficient strength against pull-out, taking into account wind load expected at a fixing location.

When the solar cell apparatus is attached to the tiled roof in the present embodiment, initially, a position at which the support device is to be attached is determined. Preferably, the support device is attached in a region where the rafter is arranged, in order to achieve fixing with sufficient strength. In many cases, a pitch between the rafters is set to 455 mm. Considering a distance between support points of the attachment hardware fixed to the support device, the position at which the support device is to be attached is determined in a range tolerable in terms of strength.

The roof tile located at the position where the support device is to be attached is marked. The marked roof tile is removed from the roof In many cases, the roof tile is fitted to a roof tile adjacent in an up-down direction or a left-right direction. In removing a specific roof tile, for example, roof tiles nearby are lifted so as not to break the specific roof tile.

Thereafter, the through hole for inserting the tubular portion of the support device is drilled in the roof tile using an electric drill or the like. The through hole is formed to have a diameter larger than the outer diameter of the tubular portion of the support device. In many cases, the roof tile is formed from earthenware or the like and the material thereof is hard. Therefore, if the through hole is formed in several roof tiles, a blade of the electric drill is heated and its sharpness may be lowered. In this case, sharpness of the blade can be maintained satisfactorily by cooling the blade by a method such as immersion into water. The through hole formed in the roof tile does not necessarily have to be strictly as large as design value, and the through hole should only be as large as allowing passage of the tubular portion. Preferably, the sufficiently large through hole is formed, such that the through hole is in non-contact with the tubular portion around a circumference.

Referring to FIG. 1, reinforcement plate 6 is attached to sheathing 8 at a position where the roof tile has been removed, in order to ensure attachment strength of support device 3. Reinforcement plate 6 is formed in a plate shape and has a sufficient thickness. Among roof tiles, the Japanese roof tile has a curved surface. If the through hole is formed in a top portion (crest portion) of a convex portion when viewed in cross-section, the roof tile may break. Accordingly, in the Japanese roof tile, the through hole is preferably formed in a concave portion (trough portion) when viewed in cross-section. Depending on a type of the roof tile, a position at which the through hole is formed is restricted, and it is not always the case that support device 3 can be fixed to the rafter. Meanwhile, if reinforcement plate 6 arranged on the surface of sheathing 8 is fixed to the rafter and reinforcement plate 6 is arranged under support device 3, fixing strength of support device 3 can sufficiently be high.

Thereafter, the roof tile having the through hole formed is returned to its original position and the original state of the roof is recovered. Here, whether or not the roof tile is lifted or displaced in the up-down direction or the left-right direction is checked. In addition, a state of fitting with adjacent roof tile is checked. If the roof tile is not properly set, leaking of rain or falling of the roof tile may occur. Therefore, checking should be done carefully.

In returning the roof tile to the original position, a water-shutoff agent such as waterproof butyl rubber may be attached along the perimeter of the through hole on a backside of the roof tile. By adopting this configuration, the gap between the through hole and the tubular portion can be closed by the water-shutoff agent and prevention of intrusion by water through the through hole can further be ensured.

As shown in FIGS. 1 and 2, pressing member 22 and water-shutoff member 21 are arranged in a portion of the through hole in roof tile 5. Thereafter, while tubular portion 11 is inserted in the hole in pressing member 22 and the like and through hole 31 in roof tile 5, support device 3 is arranged at a position where it should be fixed. Referring to FIG. 2, retainer 23 is inserted in advance in support device 3 through insertion hole 15 located above. Retainer 23 remains in such a state as screwed and attached to screw attachment portion 14.

Referring next to FIGS. 1 and 2, attachment hardware 2 is arranged on the surface of support device 3, and fixing member 7 is hammered into sheathing 8. Attachment hardware 2 and support device 3 are thus fixed to sheathing 8. As fixing member 7 is formed like a nail in the present embodiment, attachment hardware 2 and support device 3 can be fixed to sheathing 8 at a time by hammering the same from above. In addition, attachment hardware 2 can be fixed to sheathing 8 in a short period of time. As described above, the base can readily be fixed to the sheathing. A member formed to have a tip end threaded so that it can be screwed into the sheathing may be employed as fixing member 7.

Figure 3:
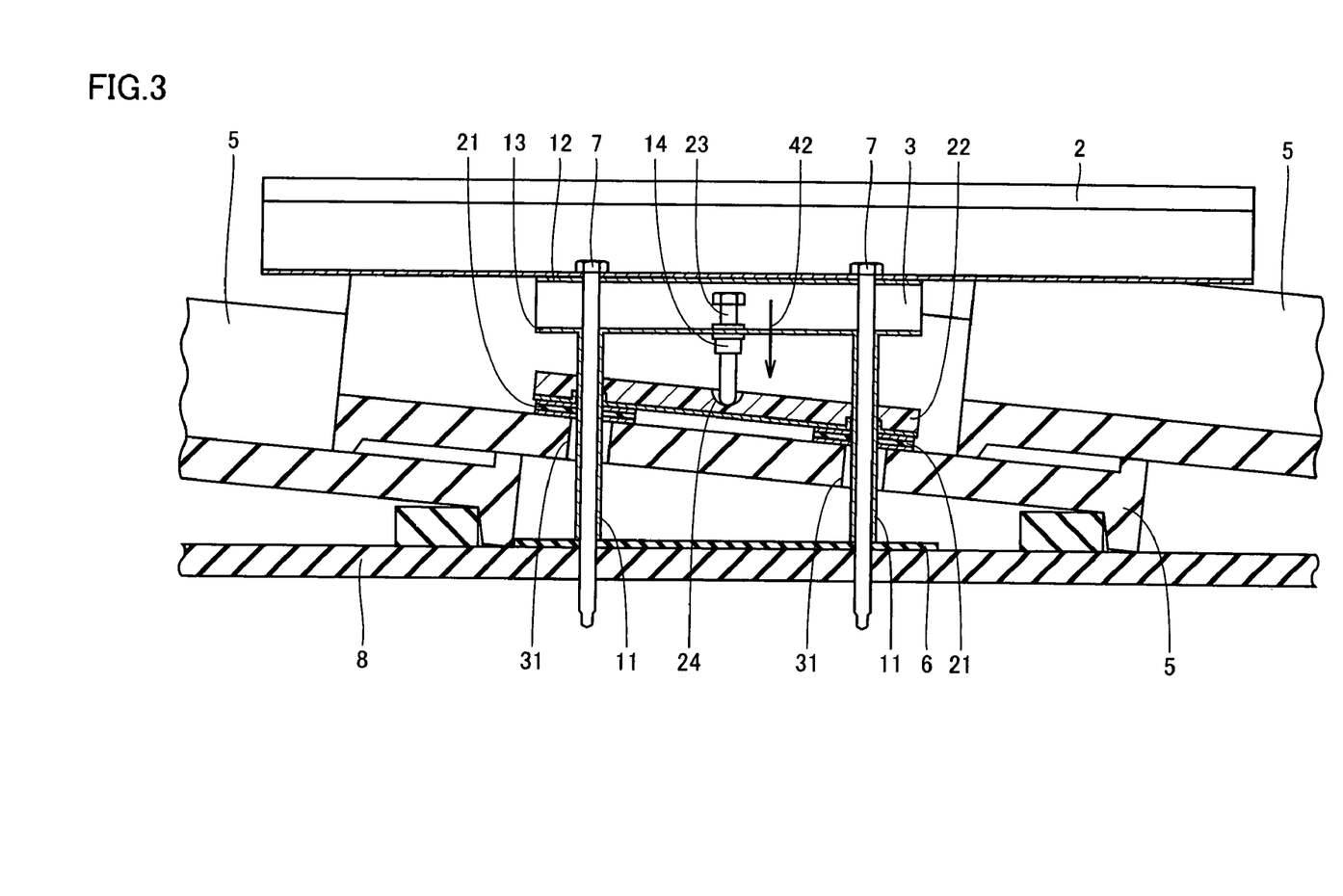
FIG. 3 is another enlarged schematic cross-sectional view of the structure fixing apparatus according to the first embodiment.

FIG. 3 is another enlarged schematic cross-sectional view of a portion of the support device according to the present embodiment. In the present embodiment, after support device 3 is fixed to sheathing 8, retainer 23 is turned, so that retainer 23 moves in a direction shown with an arrow 42. As a result of movement of retainer 23, pressing member 22 moves to press water-shutoff member 21 against roof tile 5. When water-shutoff member 21 is pressed, water-shutoff member 21 comes in intimate contact with tubular portion 11 and the surface of roof tile 5. As a result of pressing of water-shutoff member 21, the gap between tubular portion 11 and through hole 31 can be sealed by water-shutoff member 21, and intrusion by rainwater can be prevented.

In the present embodiment, after water-shutoff member 21 and pressing member 22 are arranged on the surface of the roof tile, tubular portion 11 is inserted, however, the present embodiment is not limited as such. Instead, pressing member 22 and water-shutoff member 21 may be inserted in tubular portion 11 first.

The fixing apparatus of the solar cell apparatus in the present embodiment includes the fixing member formed to reach the sheathing through the support device and the roof tile, and the tubular portion formed to surround the fixing member. The tubular portion is formed to be smaller in size than the through hole formed in the roof tile, and at least a part of the tubular portion is in non-contact with the through hole. By adopting this configuration, the fixing apparatus of the solar cell apparatus can have a simplified structure. In addition, as the through hole and at least a part of the tubular portion are in non-contact with each other, damage to the roof tile can be avoided.

In addition, the height of the support device can be varied by varying a length of the tubular portion. Consequently, the height of the base to which the solar cell module is fixed can readily be adjusted. Accordingly, the present invention can be applied to a variety of types of tiled roofs. For example, the tubular portion is formed to have a sufficient length in a manufacturing stage of the fixing apparatus of the solar cell apparatus, and the tubular portion is cut at a working site where the solar cell apparatus is to be attached, thus the length of the tubular portion can readily be varied.

Moreover, an inclination angle in arranging the solar cell module can readily be adjusted by varying the length of the tubular portion. For example, if the tubular portion on one side has a longer length and the tubular portion on the other side has a shorter length, the solar cell module can be arranged such that the height from the sheathing gradually becomes smaller from one side toward the other side.

Further, in the present embodiment, the entire tubular portion around the circumference is formed to be in non-contact with the through hole formed in the roof tile. By adopting this configuration, it is not necessary to strictly adjust a size of the through hole, and the through hole can readily be formed in the roof tile. In addition, as there is no portion in contact between the tubular portion and the through hole, prevention of damage to the roof tile can further be ensured.

In the present embodiment, the water-shutoff member formed to close the through hole in the roof tile, the pressing member for pressing the water-shutoff member against the roof tile, and the retainer fixed to the support device and formed to be movable toward the pressing member are provided. By adopting this configuration, the gap between the tubular portion and the through hole can readily be closed. In addition, as in the present embodiment, after the base is fixed, sealing with the water-shutoff member with respect to the roof tile can be performed.

Moreover, in the present embodiment, the recessed portion is formed in the portion on which the retainer of the pressing member abuts. The recessed portion is formed to have a tapered cross-section. By adopting this configuration, even if the retainer is inclined in accordance with inclination of the roof tile, the retainer can press the pressing member in a stable manner.

In the present embodiment, the recessed portion is formed to have an arc-shaped cross-section. By adopting this configuration, even if the pressing member is inclined, the pressing member can be pressed against the roof tile in a stable manner. Preferably, the recessed portion has a hexagonal shape when viewed two-dimensionally. By adopting this configuration, the pressing member can be pressed in a more stable manner.

The support device in the present embodiment is formed to have a cup shaped cross-section. The attachment hardware is attached to one plate portion and the tubular portion is formed in the other plate portion thereof By forming the cup-shaped cross-section, the support device can have a smaller weight, and sufficient strength can be ensured. In addition, as in the present embodiment, the retainer for pressing the pressing member can be arranged between one plate portion and the other plate portion.

In the present embodiment, the retainer is screwed and attached to the other plate portion of the support device. By adopting this configuration, assembly is facilitated, and the retainer can press the water-shutoff member after the base is fixed. In addition, the number of turns of the retainer is varied, so that strength with which the water-shutoff member is pressed can readily be adjusted. Consequently, fracture in the roof tile as a result of application of excessive force can be prevented.

Though the cup-shaped portion and the tubular portion of the support device are integrally formed in the present embodiment, the embodiment is not limited as such, and other members may be employed. Alternatively, the support device may be formed in such a manner that the tubular portion and the portion having a cup-shaped cross-section are formed in separate steps and thereafter integrated by welding or the like. In addition, though the retainer and the water-shutoff member are separate from each other in the present embodiment, the embodiment is not limited as such, and the water-shutoff member may be adhered to the pressing member in advance.

The water-shutoff member can be formed from butyl rubber, foamed EPDM (ethylene propylene) rubber, or the like. A material or a shape of the water-shutoff member is not particularly limited, and any member capable of closing the gap between the tubular portion and the through hole as a result of compression may be employed. In addition, though the gap between the tubular portion and the roof tile is sealed by means of the water-shutoff member, the pressing member and the retainer in the present embodiment, the embodiment is not limited as such. For example, a caulking compound or the like may fill the gap between the through hole and the tubular portion so as to shut off water.

Referring to FIG. 2, in the present embodiment, insertion hole 15 is formed in support device 3, so as to fix retainer 23 to support device 3 in advance. The embodiment, however, is not limited as such. For example, a hole may be formed in a position corresponding to the position of retainer 23 of attachment hardware 2, attachment hardware 2 and support device 3 may be fixed to sheathing 8, and thereafter retainer 23 may be inserted through the formed hole.

Alternatively, referring again to FIG. 1, an elastic member such as a coil spring may be arranged between support device 3 and pressing member 22 instead of retainer 23, and elasticity of the elastic member may serve to press water-shutoff member 21. By adopting this configuration, simultaneously with hammering fixing member 7 into sheathing 8, pressing member 22 can be pressed toward through hole 31. Namely, fixing of support device 3 and water shutoff around through hole 31 can simultaneously be achieved. In addition, the configuration of the fixing apparatus can be simplified.

In the present embodiment, the main surface of the pressing member is arranged substantially in parallel to the main surface of the roof tile. Specifically, referring to FIG. 1, though pressing member 22 is arranged in a manner inclined when viewed from the side, the embodiment is not limited as such. Alternatively, pressing member 22 may be formed such that its top surface extends substantially horizontally.

The present embodiment is configured such that the pressing member inclined with respect to the surface of the sheathing is arranged, and the retainer presses the pressing member from a direction substantially perpendicular to the surface of the sheathing, however, the embodiment is not limited as such. For example, the retainer should only be formed to press the pressing member.

Figure 5:
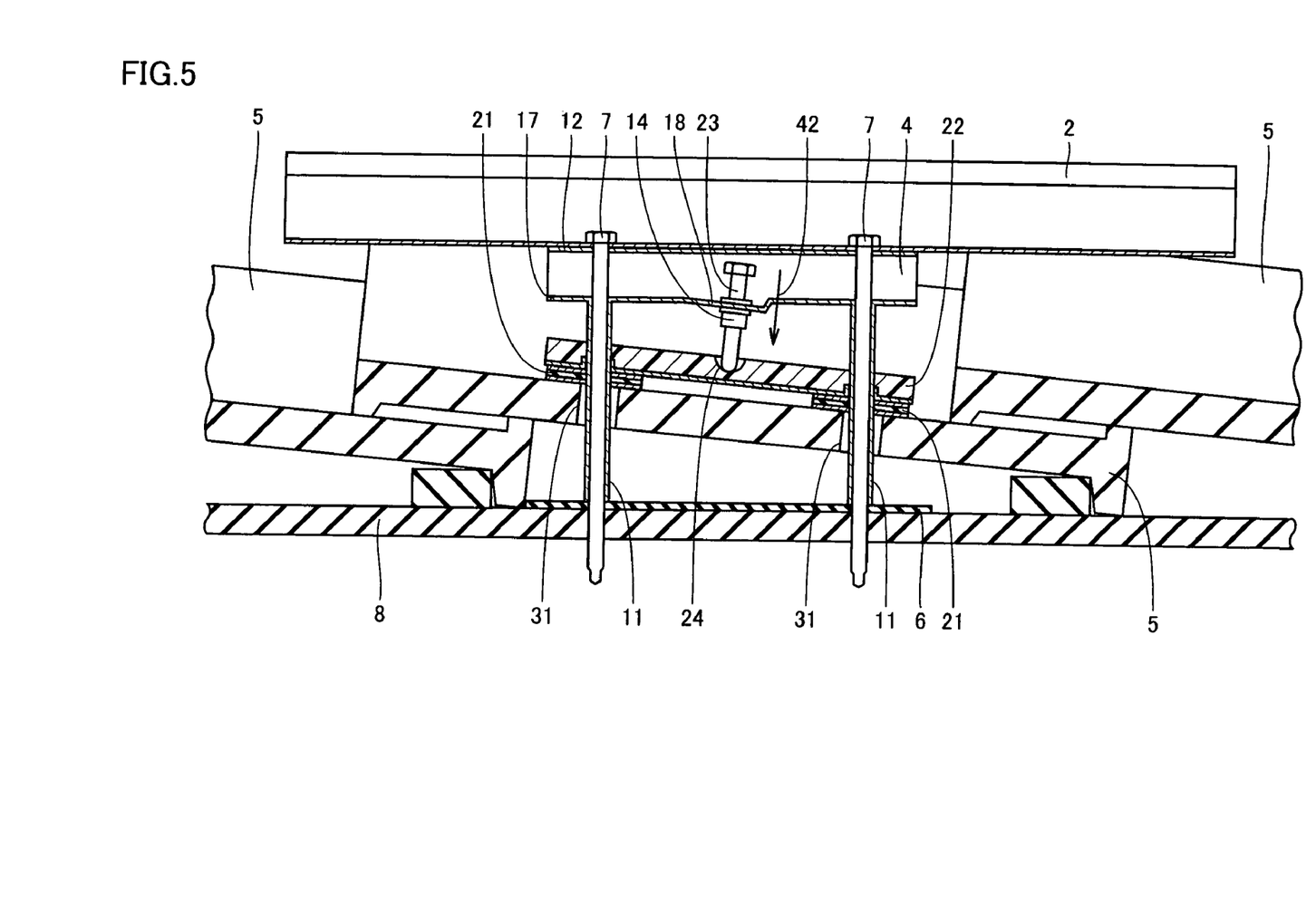
FIG. 5 is an enlarged schematic cross-sectional view of another structure fixing apparatus according to the first embodiment.

FIG. 5 is a cross-sectional view of another structure fixing apparatus according to the present embodiment. Another fixing apparatus includes a support device 4 having a cup-shaped cross-section, and support device 4 includes one plate portion 12 and the other plate portion 17. The other plate portion 17 includes an attachment portion 18. Pressing member 22 is attached to attachment portion 18. Attachment portion 18 in the other plate portion 17 is formed such that its surface is substantially in parallel to the surface of pressing member 22. Namely, retainer 23 is arranged to extend in a direction perpendicular to the main surface of pressing member 22. By adopting this configuration, water-shutoff member 21 can be compressed in a direction substantially perpendicular to the surface of the roof tile, and watertightness can further be improved.

In addition, in the present embodiment, the fixing member is formed such that it is fixed as a result of sticking through the sheathing. By adopting this configuration, the configuration of the fixing member can be simplified. The fixing member is not limited as such, and for example, the fixing member is fixed to the sheathing by fixing a nut to the sheathing and by screwing and attaching the fixing member to the nut.

Second Embodiment

A structure fixing apparatus according to a second example embodiment will be described with reference to FIGS. 6 and 7.

Figure 6:
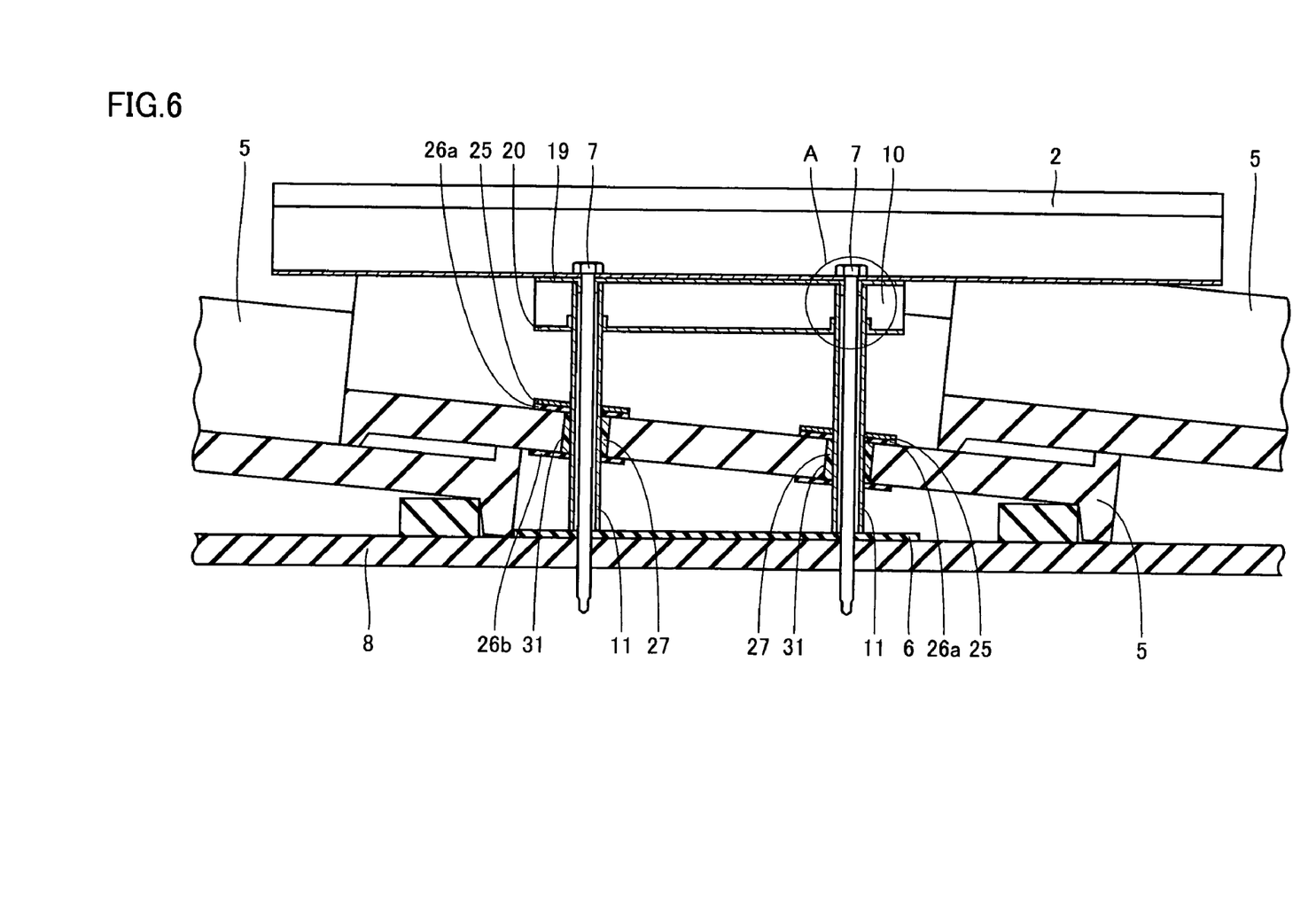
FIG. 6 is an enlarged schematic cross-sectional view of a structure fixing apparatus according to a second embodiment.

FIG. 6 is an enlarged schematic cross-sectional view of the structure fixing apparatus for the solar cell apparatus according to the present embodiment. The structure fixing apparatus according to the present embodiment includes a support device 10. Support device 10 includes tubular portion 11. Tubular portion 11 is arranged such that it is inserted in through hole 31 formed in roof tile 5. Tubular portion 11 abuts on reinforcement plate 6 arranged on the surface of sheathing 8. Fixing of support device 10 to sheathing 8 by means of fixing member 7 is the same as in the first embodiment.

Support device 10 in the present embodiment includes a portion formed to have a cup-shaped cross-section. The cup-shaped portion has two opposing plate portions 19, 20. In the present embodiment, the cup-shaped portion and tubular portion 11 are formed as separate elements and fixed to each other.

Figure 7:
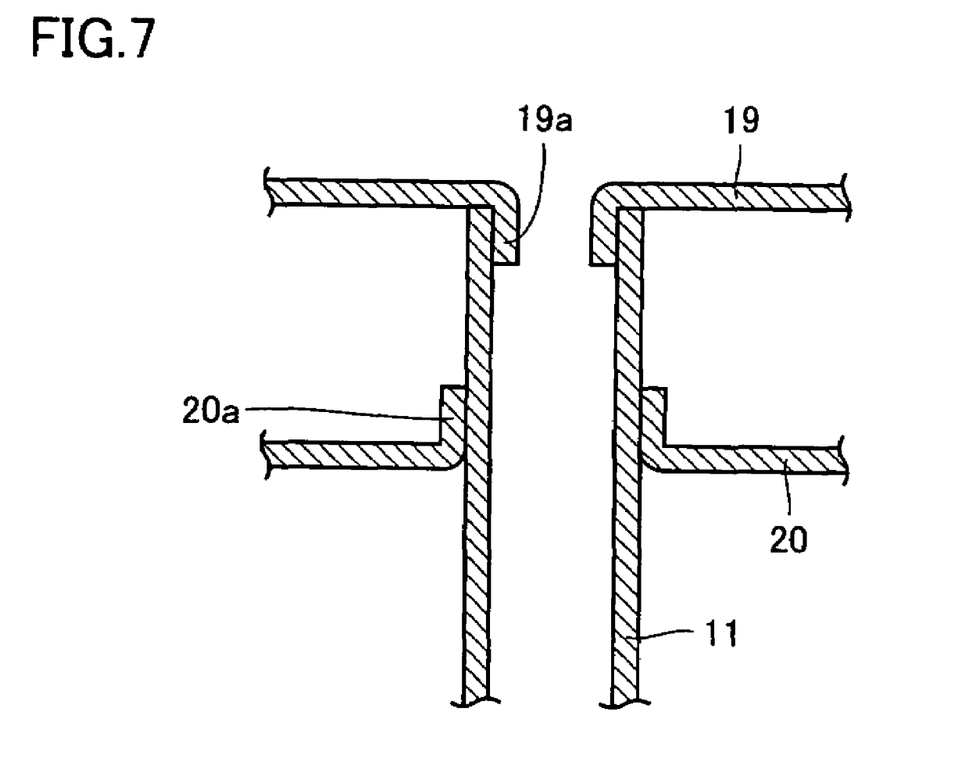
FIG. 7 is an enlarged schematic cross-sectional view of a joint portion of a tubular portion and a cup-shaped portion in a support device of the second embodiment.

FIG. 7 is an enlarged schematic cross-sectional view of the support device in a portion A in FIG. 6. Referring to FIGS. 6 and 7, a through hole is formed in one plate portion 19 and a fin portion 19a is formed along the through hole. A through hole is formed in the other plate portion 20, and a fin portion 20a is formed along the through hole. In the present embodiment, tubular portion 11 is fixed to fin portions 19a, 20a by compression bonding. A method of fixing tubular portion 11 is not limited as such, and tubular portion 11 may be fixed using welding or adhesion.

Support device 10 is integrally implemented in such a manner that tubular portion 11 is fixed to two plate portions 19, 20. Tubular portion 11 is fixed such that it extends substantially perpendicular to the main surface of the other plate portion 20.

In the present embodiment, tubular portion 11 is arranged outside fin portion 20a. Tubular portion 11 is arranged inside fin portion 20a. By adopting this configuration, displacement of an axis in fixing tubular portion 11 to support device 10 can be prevented, and positioning of tubular portion 11 can readily be carried out.

An upper end surface of tubular portion 11 abuts on one plate portion 19. By adopting this configuration, protrusion of tubular portion 11 from one plate portion 19 can be prevented. If tubular portion 11 is fixed using such welding that swell at a joint is exposed on an upper surface of one plate portion 19, exposure of the swell of the joint on the upper surface of one plate portion 19 can be prevented. Consequently, unevenness on the surface of one plate portion 19 is suppressed, so that intimate contact with attachment hardware 2 can be achieved and fixing to attachment hardware 2 can be more stable.

In the present embodiment, fin portion 19a is formed toward the other plate portion 20. In other words, fin portion 19a is formed in a direction opposite to where attachment hardware 2 is arranged. By adopting this configuration, the surface where attachment hardware 2 is arranged can be flat. Though fin portion 20a in the other plate portion 20 is formed toward plate portion 19, the fin portion is not limited as such, and it may be formed in any direction. Alternatively, tubular portion 11 may be fixed to two plate portions 19, 20 by using welding or the like, without forming fin portions 19a, 20a.

Referring to FIG. 6, through hole 31 is formed in roof tile 5, in a manner penetrating in a direction of thickness. Tubular portion 11 is inserted in through hole 31. A water-shutoff member 26a is arranged in a portion of the surface of roof tile 5 where through hole 31 is formed. In addition, a water-shutoff member 26b is arranged in a portion of the back surface of roof tile 5 where through hole 31 is formed. In the present embodiment, water-shutoff members 26a, 26b are formed like a plate. Water-shutoff members 26a, 26b are formed to close through hole 31. In the present embodiment, water-shutoff members 26a, 26b are formed from butyl rubber.

Water-shutoff member 26a is formed so as to come in intimate contact with the surface of roof tile 5 and an outer circumferential surface of tubular portion 11 and to close the gap between roof tile 5 and tubular portion 11 as a result of pressing from above. A filler material 27 fills a space surrounded by through hole 31, tubular portion 11 and water-shutoff members 26a, 26b. In the present embodiment, silicone rubber serving as filler material 27 fills the space. The filler material is not limited as such, and any member capable of filling the gap between the tubular portion and the through hole may be employed.

A pressing member 25 like a flat plate is arranged on water-shutoff member 26a. A hole for inserting tubular portion 11 is formed in pressing member 25. Pressing member 25 having excellent corrosion resistance is preferred, and pressing member 25 in the present embodiment is formed from Super Dyma™ of Nippon Steel Corporation. Pressing member 25 is not limited as such, and any member formed such that water-shutoff member 26 is pressed as a result of pressing thereof may be employed.

As described above, in the present embodiment, tubular portion 11 is formed to penetrate pressing member 25, water-shutoff members 26a, 26b and filler material 27.

The structure fixing apparatus according to the present embodiment includes the water-shutoff member formed to close the through hole from the back surface of the roof tile, the filler material filling the through hole in the roof tile, and the water-shutoff member formed to close the through hole from the surface of the roof tile. The filler material is arranged in the space surrounded by the through hole, the tubular portion and the water-shutoff member. By adopting this configuration, the gap between the tubular portion and the through hole can readily be closed. In addition, as will be described later, after the attachment hardware, which is a part of the base of the structure, is fixed to the roof, water shutoff of the through hole in the roof tile can be achieved.

In addition, the structure fixing apparatus according to the present embodiment includes the pressing member for pressing one water-shutoff member against the roof tile. By adopting this configuration, one water-shutoff member can readily be pressed. Moreover, one water-shutoff member can uniformly be pressed.

A method of attaching the structure fixing apparatus according to the present embodiment will now be described.

Referring to FIG. 6, when the solar cell apparatus is attached to the tiled roof in the present embodiment, initially, a position at which support device 10 is to be attached is determined. Preferably, support device 10 is attached in a region where the rafter is arranged, in order to achieve fixing with sufficient strength.

Roof tile 5 at the position where support device 10 is to be attached is marked. Marked roof tile 5 is removed from the roof Thereafter, through hole 31 for inserting tubular portion 11 of support device 10 is drilled in roof tile 5 using an electric drill or the like. Through hole 31 has a diameter larger than the outer diameter of tubular portion 11 of support device 10. Through hole 31 formed in roof tile 5 does not necessarily have to be strictly as large as design value, and through hole 31 should only be as large as allowing passage of tubular portion 11. Preferably, sufficiently large through hole 31 is formed such that it is in non-contact with tubular portion 11 around the circumference. Reinforcement plate 6 is attached to sheathing 8 at a position where roof tile 5 has been removed, in order to ensure attachment strength of support device 10.

Thereafter, water-shutoff member 26b formed from butyl rubber or the like is attached to the portion of the back surface of roof tile 5 where through hole 31 is formed. A hole for inserting tubular portion 11 of support device 10 is formed in water-shutoff member 26b.

Thereafter, roof tile 5 having water-shutoff member 26b attached is returned to its original position, and the original state of the roof is recovered. Then, filler material 27 such as silicone fills through hole 31 from the surface of returned roof tile 5. Water-shutoff member 26a and pressing member 25 are arranged around tubular portion 11 of support device 10.

While tubular portion 11 is inserted in through hole 31 in the roof tile, support device 10 is arranged at a position where it should be fixed. Thereafter, attachment hardware 2 is arranged on the surface of support device 10, and fixing member 7 is hammered into sheathing 8. Attachment hardware 2 and support device 10 are thus fixed to sheathing 8.

After support device 10 is fixed to sheathing 8, pressing member 25 is pressed with hands from above, so that water-shutoff member 26a is pressed against roof tile 5. As a result of pressing of water-shutoff member 26a, water-shutoff member 26a comes in intimate contact with tubular portion 11 and the surface of roof tile 5. In addition, as a result of pressing of water-shutoff member 26a, filler material 27 can seal the gap between tubular portion 11 and through hole 31 in roof tile 5, so as to prevent intrusion by rainwater.

In the present embodiment, the filler material fills the through hole before insertion of the tubular portion in the through hole in the roof tile, however, the embodiment is not limited as such. The tubular portion is inserted in the through hole first, and thereafter the filler material may fill the through hole.

As the configuration, function and effect are otherwise the same as in the first embodiment, description thereof will not be repeated.

In the drawings in connection with the embodiments described above, the same or corresponding elements have the same reference characters allotted.

In the embodiments above, the solar cell apparatus including the panel-type solar cell module has been described as an example of the structure, however, the structure is not limited as such. Any structure mounted on the roof may be employed. For example, a solar energy collector, a display apparatus, or a light emission apparatus may be employed as the structure.

According to the technology disclosed herein, a structure fixing apparatus having a simplified structure, with which a structure can be attached without damaging the roof tile, can be provided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. Apparatus for attaching a structure on a roof tile, comprising:
   a support device configured to fix and support said structure;
   a fixing member formed to reach a sheathing through said support device and said roof tile; and
   a tubular portion formed to surround said fixing member and to be inserted in a through hole formed in said roof tile; wherein
   said tubular portion is formed to be smaller in size than said through hole formed in said roof tile, and at least a part of said tubular portion is in non-contact with said through hole;
   a base, said support device being formed to support said base; and,
   wherein said support device includes a portion formed to have a cup-shaped cross-section, said support device being formed such that said base is attached to one plate portion of opposing plate portions;
   wherein a first through hole is formed in a first of the opposing plate portions and a second through hole is formed in a second of the opposing plate portions, wherein a first fin portion is formed on the first of the opposing plate portions along the first through hole, wherein a second fin portion is formed on the second of the opposing plate portions along the second through hole, and wherein the tubular portion is fixed to the first fin portion and the second fin portion by compression bonding.

2. The apparatus according to claim 1, further comprising a water-shutoff member formed to close said through hole in said roof tile around said tubular portion, wherein
   said water-shutoff member comprises a hole formed therein for insertion of said tubular portion.

3. The apparatus according to claim 2, further comprising a filler material filling a region surrounded by said through hole, said tubular portion and said water-shutoff member around said tubular portion.

4. The apparatus according to claim 1, further comprising:
   a water-shutoff member formed to close said through hole in said roof tile around said tubular portion;
   a pressing member arranged on said water-shutoff member and configured to press said water-shutoff member against said roof tile.

5. The apparatus according to claim 4, further comprising a filler material filling a region surrounded by said through hole, said tubular portion and said water-shutoff member around said tubular portion.

6. The apparatus according to claim 1, wherein said structure includes a solar cell module.

7. Apparatus for attaching a structure on a roof tile, comprising:
- a support device configured to fix and support said structure;
- a fixing member formed to reach a sheathing through said support device and said roof tile; and
- a tubular portion formed to surround said fixing member and to be inserted in a through hole formed in said roof tile; wherein
- said tubular portion is formed to be smaller in size than said through hole formed in said roof tile, and at least a part of said tubular portion is in non-contact with said through hole;
- a base, said support device being formed to support said base; and,
- wherein said support device includes a portion formed to have a cup-shaped cross-section, said support device being formed such that said base is attached to one plate portion of opposing plate portions;
- wherein a first through hole is formed in a first of the opposing plate portions and a second through hole is formed in a second of the opposing plate portions, wherein a first fin portion is formed on the first of the opposing plate portions along the first through hole, wherein a second fin portion is formed on the second of the opposing plate portions along the second through hole, and wherein the tubular portion is arranged outside the first fin portion and inside the second fin portion.

8. The apparatus according to claim 7, further comprising a water-shutoff member formed to close said through hole in said roof tile around said tubular portion, wherein
said water-shutoff member comprises a hole formed therein for insertion of said tubular portion.

9. The apparatus according to claim 8, further comprising a filler material filling a region surrounded by said through hole, said tubular portion and said water-shutoff member around said tubular portion.

10. The apparatus according to claim 7, further comprising:
- a water-shutoff member formed to close said through hole in said roof tile around said tubular portion;
- a pressing member arranged on said water-shutoff member and configured to press said water-shutoff member against said roof tile.

11. The apparatus according to claim 10, further comprising a filler material filling a region surrounded by said through hole, said tubular portion and said water-shutoff member around said tubular portion.

12. The apparatus according to claim 7, wherein said structure includes a solar cell module.

* * * * *